Patented June 10, 1924.

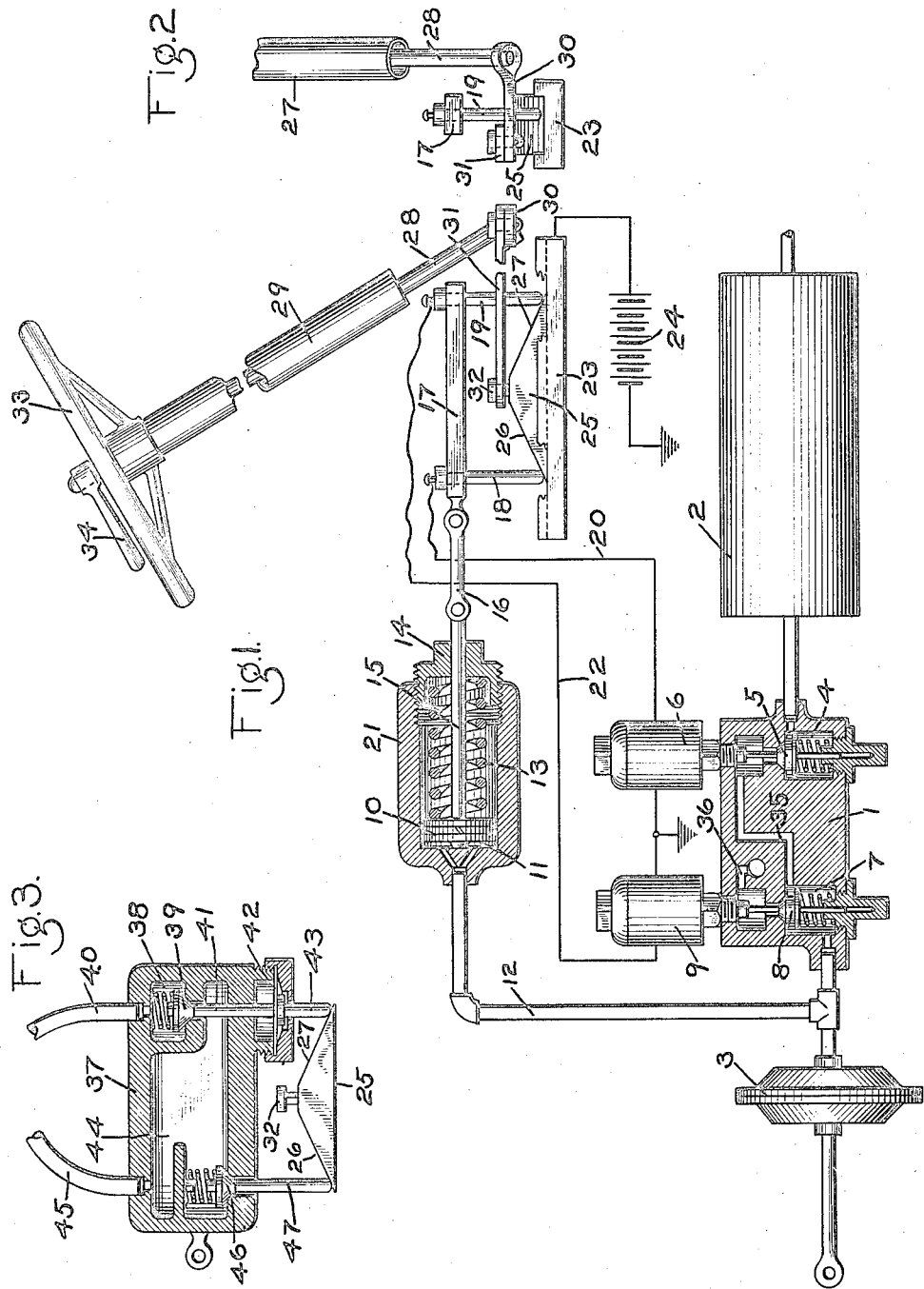

1,496,953

UNITED STATES PATENT OFFICE.

CARLTON D. STEWART, OF BERKELEY, CALIFORNIA, ASSIGNOR TO THE WESTINGHOUSE AIR BRAKE COMPANY, OF WILMERDING, PENNSYLVANIA, A CORPORATION OF PENNSYLVANIA.

FLUID-PRESSURE BRAKE.

Application filed May 14, 1921. Serial No. 469,423.

*To all whom it may concern:*

Be it known that I, CARLTON D. STEWART, a citizen of the United States, residing at Berkeley, in the county of Alameda and State of California, have invented new and useful Improvements in Fluid-Pressure Brakes, of which the following is a specification.

This invention relates to brakes, and more particularly to a brake equipment for motor vehicles.

The principal object of my invention is to provide means for automatically adjusting and maintaining the braking power at a predetermined degree according to the position of a controlling lever.

Other objects and advantages will appear in the following more detailed description of the invention.

In the accompanying drawing; Fig. 1 is a diagrammatic view, partly in section, of a vehicle brake equipment embodying my invention; Fig. 2 an end elevation of a portion of the adjusting mechanism; and Fig. 3 a sectional view of a modification adapted for fluid pressure brake control.

The equipment shown in Fig. 1, includes an electro-pneumatic brake equipment and means for regulating and determining the operating pressure in applying the brakes and the electro-pneumatic brake equipment may comprise an electro-pneumatic brake controlling valve device 1, a reservoir 2, normally charged with fluid under pressure, and a diaphragm brake cylinder 3.

The valve device 1 may comprise a casing having a valve chamber 4, containing an application valve 5, adapted to be operated by an electro-magnet 6 and having a valve chamber 7, containing an exhaust valve 8 adapted to be operated by an electro-magnet 9.

The pressure regulating mechanism may comprise a piston 10 contained in casing 21 and having a chamber 11 at one side constantly subject to the pressure of fluid in the brake cylinder 3, as supplied thereto through pipe 12, the opposite side of the piston 10 being subject to the pressure of a coil spring 13, the pressure of which may be adjusted by means of a threaded plug 14.

Connected to the piston stem 15, through a link 16, is a section of insulation 17 carrying contact pins 18 and 19, the contact pin 18 being connected by wire 20 with one terminal of the magnet 6 and the contact pin 19 being connected by wire 22 with one terminal of magnet 9, the other terminals of the magnets being connected to ground.

Under certain conditions, the contact pins 18 and 19 are adapted to engage a contact plate 23, which is connected to a grounded source of electric current 24.

For controlling the contacting of pins 18 and 19 with plate 23, a block of insulation 25 is mounted to slide on the contact plate 23. Said block 25 is provided with oppositely inclined faces 26 and 27, the incline 26 being adapted upon movement of the block 25 in one direction to engage contact pin 18 and incline 27 to engage contact pin 19 upon movement of the block 25 in the opposite direction.

For operating the block 25, a rotatable rod 28 is provided in the steering column 29 of the motor vehicle and said rod is connected at the lower end, through an arm 30 and a link 31 with a pin 32 secured to the block 25.

The upper end of the rod 28, adjacent to the steering wheel 33 is provided with an operating lever 34.

Normally, both contact pins 18 and 19 are so spaced and the block 25 is so positioned, that both pins engage the block 25 and are kept out of contact with the contact plate 23.

If it is desired to effect an application of the brakes, the handle 34 is turned a predetermined distance in a direction to shift the block 25 to the right. The contact pin 18 will then engage the contact plate 23 and close an electric circuit through the application magnet 6. The energization of magnet 6 operates to open the valve 5, so that fluid under pressure is supplied from the reservoir 2 through passage 35 to valve chamber 7 and thence to the brake cylinder 3.

Fluid thus supplied to the brake cylinder also flows through pipe 12 to piston chamber 11 and then acts on piston 10 to move same against the resistance of the spring 13.

The piston 10 continues its movement as the pressure in the brake cylinder builds up, until the member 17 has been moved a distance such that the contact pin 18 will engage the block 25 and thereby break the circuit of the application magnet 6.

The deenergization of magnet 6 then permits the valve 5 to close, cutting off the further supply of fluid to the brake cylinder.

As it requires a certain predetermined fluid pressure on the piston 10 to shift the piston 10 a predetermined distance against the resistance of the spring 13, it will be seen that by setting the handle 34 at different predetermined positions, any desired predetermined pressure may be automatically obtained in the brake cylinder, the greater the movement of the lever 34, the greater the movement of piston 10 which is required to break the contact between the contact plate 23 and the contact pin 18.

In a similar manner, when it is desired to release the brakes, the lever 34 is turned so as to shift the block 25 to the left. This movement causes the contact pin 19 to engage the contact plate 23 and thus close an electric circuit through the release magnet 9.

The energization of the release magnet 9 then operates to open the valve 8 and release fluid from the brake cylinder 3 through the exhaust port 36.

As the pressure in the brake cylinder reduces, the fluid pressure on piston 10 correspondingly reduces and the piston 10 is moved back by the spring 13, so that the block 25 is shifted to the left until the contact pin 19 engages the block 25, thereby breaking the circuit of the release magnet 9 so that the release valve 8 is permitted to close and cut off the further exhaust of fluid from the brake cylinder.

It will now be seen that the pressure in the brake cylinder may be graduated off in predetermined amounts as desired or by a sufficient movement of the lever 34, the brakes may be fully released.

When the lever 34 has been set to a position for a certain brake cylinder pressure, if there should be any leakage, causing a reduction in brake cylinder pressure below the setting of the lever 34, the piston 10 will be moved so as to again permit the contact pin to engage the contact plate 23 and thus energize the magnet 6 to effect the supply of fluid to the brake cylinder to compensate for the loss of pressure due to leakage. In other words, the apparatus operates to automatically maintain the pressure in the brake cylinder at a predetermined pressure, corresponding with the position of the lever 34.

Instead of operating to control electric circuits as hereinbefore described, the regulating mechanism may be designed to directly control the fluid pressure for controlling the application and release of the brakes, as by providing a construction, such as shown in Fig. 3.

According to this construction, a valve casing 37 is provided, having a valve chamber 38 containing a valve 39 and connected by a flexible conduit 40 with a source of fluid under pressure. The stem 41 of the valve 39 engages a diaphragm 42, the opposite side of the diaphragm having secured thereto a stem 43 for engaging the block 25.

The casing 37 also has a chamber 44 connected by a flexible conduit 45 with the brake cylinder and containing a release valve 46 having a stem 47 adapted to engage the block 25.

The valve casing 37 is connected to the link 16 and is operated by the piston 10 as in the case of the electric contact construction.

Movement of the block 25 to the right by manipulation of the lever 34, operates to raise the stem 43 by engagement with the inclined face 27 of the block 25, so that the valve 39 is opened to supply fluid from the source of pressure to the brake cylinder conduit 45.

The fluid pressure supplied to the brake cylinder then acts on piston 10 to effect the shifting of the valve casing to the right until the stem 43 has dropped sufficiently to permit the valve 39 to close.

To release the brakes, the lever 34 is operated so as to shift the block 26 to the left and thus operate the stem 47 to open the valve 46. Fluid under pressure is then released from the brake cylinder to fully release the brakes or partially, according to the extent to which the block 25 is moved to the left.

Having now described my invention, what I claim as new and desire to secure by Letters Patent, is:—

1. In a fluid pressure brake, the combination with a brake cylinder and a tappet, the movement of which is adapted to effect the supply of fluid to the brake cylinder, of a manually operated wedge block for engaging and operating said tappet and a piston operated by brake cylinder pressure for shifting said tappet to its inactive position.

2. In a fluid pressure brake, the combination with a brake cylinder, of coacting movable members, means operative upon relative movement of one member for supplying fluid to the brake cylinder and upon relative movement of the other member for cutting off the supply of fluid to the brake cylinder, and a device operated by brake cylinder pressure for operating the last mentioned member.

3. In a fluid pressure brake, the combination with a brake cylinder, of coacting movable members, the relative movement of one member adapted to effect the supply of fluid to the brake cylinder and the relative movement of the other member the cutting off of the supply fluid to the brake cylinder, manually operated means for moving one member, and a device operated according to the pressure in the brake cylinder for moving the other member.

4. In a fluid pressure brake, the combination with a brake cylinder, of a movable member, means including an element operable upon movement of said member for supplying fluid to the brake cylinder, and a device operated upon an increase in brake cylinder pressure for operating said element to cut off the supply of fluid to the brake cylinder.

5. In a fluid pressure brake, the combination with a brake cylinder, of a movable member, means including elements operable upon movement of said member for controlling the supply and the exhaust of fluid to and from the brake cylinder, and a device operated according to the degree of pressure in the brake cylinder for operating said elements.

6. In a fluid pressure brake, the combination with a brake cylinder, of a movable member having an inclined face, a contact member adapted to engage said face and operable upon movement of said movable member for closing an electric circuit, and means operable upon the closure of said circuit for supplying fluid to the brake cylinder.

7. In a fluid pressure brake, the combination with a brake cylinder, of a movable member having opposite inclined faces, a contact member adapted to engage each inclined face, each contact member being operable upon movement of said movable member for closing an electric circuit, and means operable upon closure of one electric circuit for supplying fluid to the brake cylinder and upon closure of the other electric circuit for releasing fluid from the brake cylinder.

8. In a fluid pressure brake, the combination with a brake cylinder, of a movable member having opposite inclined faces, means including elements adapted to engage each inclined face and operable upon movement of said member for controlling the supply and release of fluid to and from the brake cylinder, and a device operated according to the degree of pressure in the brake cylinder for also operating said elements.

9. In an electro-pneumatic brake, the combination with a brake cylinder and magnet controlled means for controlling the supply of fluid to the brake cylinder, of a contact for controlling the circuit of said magnet controlled means, a member movable manually for operating said contact to close said circuit, and a device operated by brake cylinder pressure for operating said contact to open the circuit.

10. In an electro-pneumatic brake, the combination with a brake cylinder, an electro-magnet and valve for controlling the supply of fluid to the brake cylinder, and an electro-magnet and valve for controlling the release of fluid from the brake cylinder, of a contact for controlling the circuit of each magnet, a member movable manually for operating said contacts, and a device operated according to the pressure in the brake cylinder for also operating said contacts.

11. In an electro-pneumatic brake, the combination with a brake cylinder, an electro-magnet and valve for controlling the supply of fluid to the brake cylinder, and an electro-magnet and valve for controlling the release of fluid from the brake cylinder, of a contact for controlling the circuit of each magnet, a member having opposite inclined faces for respectively engaging said contacts to control the circuit of the corresponding magnet upon movement of said member, and a device operated by brake cylinder pressure for also actuating said contacts.

In testimony whereof I have hereunto set my hand.

CARLTON D. STEWART.